(12) United States Patent
Valicoff, Jr.

(10) Patent No.: US 6,298,672 B1
(45) Date of Patent: Oct. 9, 2001

(54) PRODUCE MERCHANDISER

(76) Inventor: Robert Valicoff, Jr., 5150 Yakima Valley Hwy., Wapato, WA (US) 98951

( * ) Notice: Subject to any disclaimer, the term of this patent is extended or adjusted under 35 U.S.C. 154(b) by 0 days.

(21) Appl. No.: 09/629,650

(22) Filed: Aug. 1, 2000

(51) Int. Cl.$^7$ ................................................. F25D 25/00
(52) U.S. Cl. ................................................. 62/62; 62/250
(58) Field of Search .............................. 62/62, 250, 378, 62/426

(56) References Cited

U.S. PATENT DOCUMENTS

| | | | |
|---|---|---|---|
| 2,152,219 | 3/1939 | Smith | 62/139 |
| 2,163,062 | * 6/1939 | Riesenkonig . | |
| 2,598,156 | 5/1952 | Brill et al. | 312/71 |
| 2,635,434 | 4/1953 | Bently | 62/89.5 |
| 3,552,138 | 1/1971 | Davis | 62/249 |
| 3,850,363 | * 11/1974 | Jacobs | 229/51 R |
| 4,161,868 | 7/1979 | Kennedy et al. | 62/256 |
| 5,261,253 | 11/1993 | Spenard | 62/250 |
| 5,403,081 | 4/1995 | Anderson | 312/236 |
| 5,791,749 | 8/1998 | O'Neill et al. | 312/117 |

OTHER PUBLICATIONS

Warner Electric, "Warner Installation and Operation Manual—Electrak 5 Series / Electromechanical Linear Actuators." 1996.

* cited by examiner

Primary Examiner—William E. Tapolcai
Assistant Examiner—Mohammad M. Ali
(74) Attorney, Agent, or Firm—Stratton Ballew PLLC

(57) ABSTRACT

A produce merchandiser for displaying produce, such as fresh fruit and the like, at a controlled temperature. The produce merchandiser includes a bin receiving structure and a bin for containing produce. The bin receiving structure has a base, and a refrigeration unit mounted on the base. The refrigeration unit supplies cooled air to the produce. The bin receiving structure also includes a mast mounted to the base and extending substantially vertically therefrom. A lifting mechanism, comprising a carriage and an actuator, is also provided. The carriage includes at least one bin floor support arm, and is adapted to travel vertically on the mast. The actuator is for raising and lowering the carriage. The bin of the produce merchandiser is removably installed on the base unit. The bin includes a first side wall and a second side wall, the first and second side walls spaced apart from and parallel to one another, a first end wall substantially perpendicular to the first and second side walls; and a second end wall spaced apart from and parallel to the first end wall. At least one support arm aperture is provided in the first end wall of the bin for receiving the bin floor support arm. The bin additionally includes a movable floor, which is engageable with the carriage of the bin receiving structure. The produce merchandiser of the present invention provides an apparatus for displaying a bin of produce, while at the same time maintaining the ideal temperature of the produce by providing cooled air to the produce. The floor of the bin can be raised or lowered as needed to present the contents of the bin at an optimum height.

14 Claims, 12 Drawing Sheets

PRODUCE MERCHANDISER

TECHNICAL FIELD

The invention relates to the field of refrigerated merchandise display units. More specifically, the invention relates to a refrigerated merchandiser for produce, such as apples.

BACKGROUND OF THE INVENTION

It is well known in the fresh produce industry that many varieties of fresh produce require storage at cool temperatures in order to maintain produce quality and prolong storage life. Storage under refrigerated conditions is required if produce growers, wholesalers, and retailers are to maximize profits on the produce they sell.

Controlled atmosphere storage is used successfully for storing produce after harvest. Some varieties of apples can be stored for several months in controlled atmosphere storage without an appreciable decrease in quality. However, once the apples are removed from controlled atmosphere storage and transported to a retail location, they are usually subjected to higher temperatures, which are not ideal for maintaining optimal fruit quality.

Despite the superior quality of produce stored under refrigeration, it is not uncommon for retailers to display and sell produce from unrefrigerated bins or shelves. For example, bags of apples are often stored and sold at room temperature due to a lack of practical and affordable refrigerated display space. As a result, consumers receive apples of inferior quality, and sellers lose revenue on damaged or unsaleable produce.

Apples are often stored in bins in a controlled atmosphere storage facility. Any handling of the apples which occurs during transfer from storage to a wholesale or retail location can result in damage to the fruit, making it unsaleable.

Based on the foregoing, it can be seen that it would be desirable to have an apparatus for storing and displaying produce such as apples, which would avoid the above noted problems. Specifically, it would be desirable to have an apparatus for maintaining optimal produce storage temperature while the produce is on display for sale. Additionally, it would be desirable to have such an apparatus that is portable, so that it can be positioned in an optimum location to encourage sales, or be moved from time to time as needs require. Furthermore, it would desirable for such an apparatus to provide a mechanism for raising the level of the produce being displayed, as produce is removed from the display, in order to maintain a full appearance and easy accessibility of the produce to the consumer.

Several U.S. patents attempt to provide such an apparatus. For example, U.S. Pat. No. 5,403,081 (Anderson 1995) discloses a tote bin cooler for facilitating the handling, cooling and display of bulk shipped fresh produce at the point of sale. The apparatus includes a refrigerated cabinet adapted to receive a produce tote bin through an opening in the side of the cabinet. Straps are provided for engaging the tote bin and pulling it into position in the cabinet. The tote bin has a movable floor that can be raised as produce is removed from the bin. A scissor jack type lifting mechanism is provided for lifting the floor.

U.S. Pat. No. 5,261,253 (Spenard 1993) discloses a device similar to the Anderson '081 device. The Spenard '253 device employs a pair of inflatable air bladders to raise and lower the movable floor of the tote bin. Spenard provides conveyor rollers over which the tote bin is rolled for positioning the tote bin in the cabinet.

While the Anderson and Spenard devices provide a partial solution to the problems described above, further improvements are needed. A device which is relatively inexpensive to manufacture and transport would be an improvement over the known devices. Additionally, a device which can easily receive and discharge a tote bin would be desirable. Because the device would be placed on a retail sales floor, it would further be desirable to make it as compact, streamlined and attractive as possible to maximize usage of the available space.

SUMMARY OF THE INVENTION

The invention provides a produce merchandiser for displaying produce at a controlled temperature. The produce merchandiser includes a bin receiving structure and a bin for containing produce. The bin receiving structure has a base, and a refrigeration unit mounted on the base. The refrigeration unit supplies cooled air to the produce. The bin receiving structure also includes a mast mounted to the base and extending substantially vertically therefrom. A lifting mechanism, comprising a carriage and an actuator, is also provided. The carriage includes at least one bin floor support arm, and is adapted to travel vertically on the mast. The actuator is for raising and lowering the carriage. The bin of the produce merchandiser is removably installed on the base unit. The bin includes a first side wall and a second side wall, the first and second side walls spaced apart from and parallel to one another, a first end wall substantially perpendicular to the first and second side walls; and a second end wall spaced apart from and parallel to the first end wall. At least one support arm aperture is provided in the first end wall of the bin for receiving the bin floor support arm. The bin additionally includes a movable floor, which is engageable with the carriage of the bin receiving structure.

In an embodiment of the invention, the base further includes at least one substantially horizontal bin support rail for receiving and balancing the bin on the bin support structure.

In an additional embodiment of the invention, first and second substantially horizontal bin support rails are provide. The bin support rails are positioned in parallel spaced apart relation to one another.

In a further embodiment of the invention, the refrigeration unit is a split system refrigeration unit having a condenser component and an evaporator component.

In an additional embodiment of the invention, the carriage includes a first bin floor support arm and a second bin floor support arm. The bin floor support arms are spaced apart from and parallel to one another.

In yet another embodiment of the invention, the bin walls include perforations, and the bin includes a liner for limiting the flow of air through the perforations.

In an embodiment of the invention, the bin is collapsible.

In a further embodiment of the invention, a support arm aperture is provided for receiving the bin floor support arm.

It is an object of the present invention to provide a produce merchandiser for displaying produce at a controlled temperature. Specifically, the produce merchandiser of the present invention provides an apparatus for displaying a bin of produce, while at the same time maintaining the ideal temperature of the produce by providing cooled air to the produce. Additionally, it is an object of the invention to provide a produce merchandiser having a floor that can be raised or lowered as needed to present the contents of the bin at an optimum height. It is a further object of the invention to provide a compact, streamlined, and attractive produce merchandiser. It is an additional object of the invention to provide a produce merchandiser which is relatively inexpensive to manufacture, transport, and maintain. It is yet a further object of the invention to provide a produce merchandiser with a bin that can be easily installed and removed using conventional equipment, such as a forklift or pallet jack. It is additionally an object of the present invention to provide a produce merchandiser that can be relocated as necessary, without requiring the use of equipment.

These and other objects and advantages of the invention will be made clear by the detailed description and drawings which follow.

DETAILED DESCRIPTION OF SPECIFIC EMBODIMENTS

Figure 1:
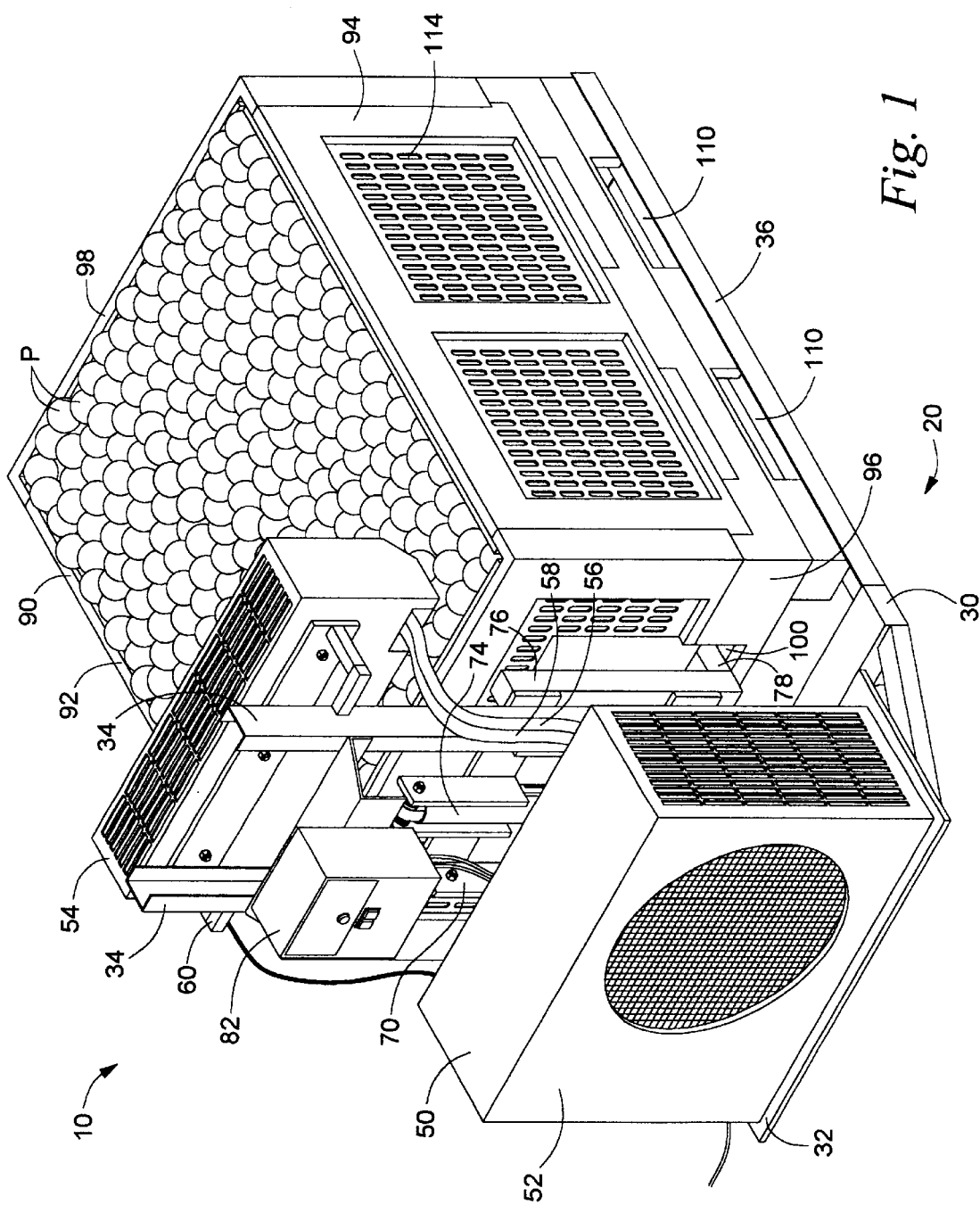
FIG. 1 is an isometric view of an embodiment of the produce merchandiser of the present invention.

The invention comprises a produce merchandiser 10, as shown in FIGS. 1 through 4 and 16 through 18 of the accompanying drawings. The produce merchandiser includes a bin receiving structure 20 and a bin 90. The bin receiving structure includes a base 30, a refrigeration unit 50, and a lifting mechanism 70. The bin is for containing produce p, and is receivable on the bin receiving structure. For the purposes of this invention, the term "produce" includes any food product, and additionally includes any non-food product requiring temperature controlled storage and display. The bin has a movable floor 102 that is engageable with the lifting mechanism of the bin receiving structure.

Figure 2:
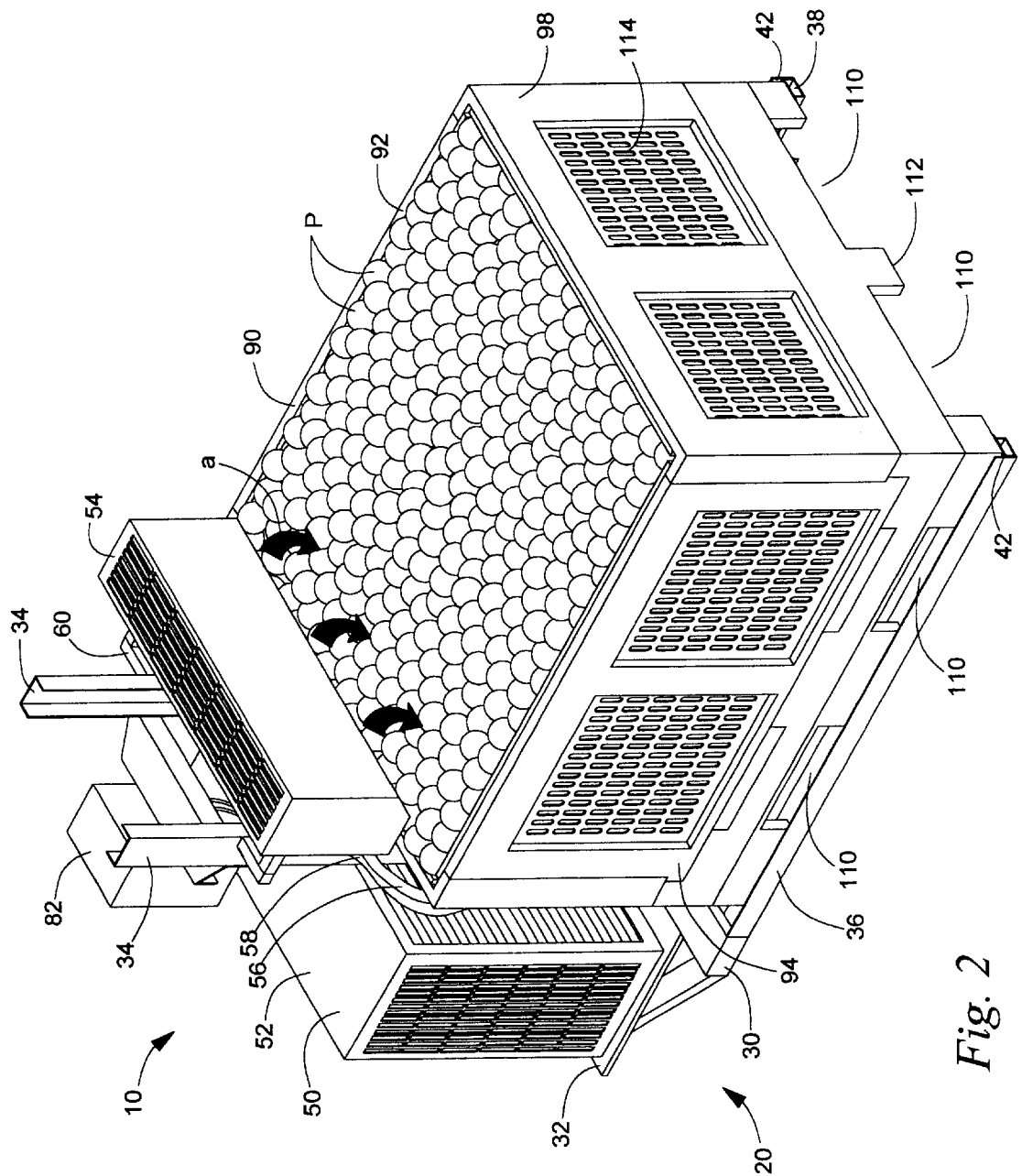
FIG. 2 is an isometric view of an embodiment of the produce merchandiser of the present invention.
Figure 3:
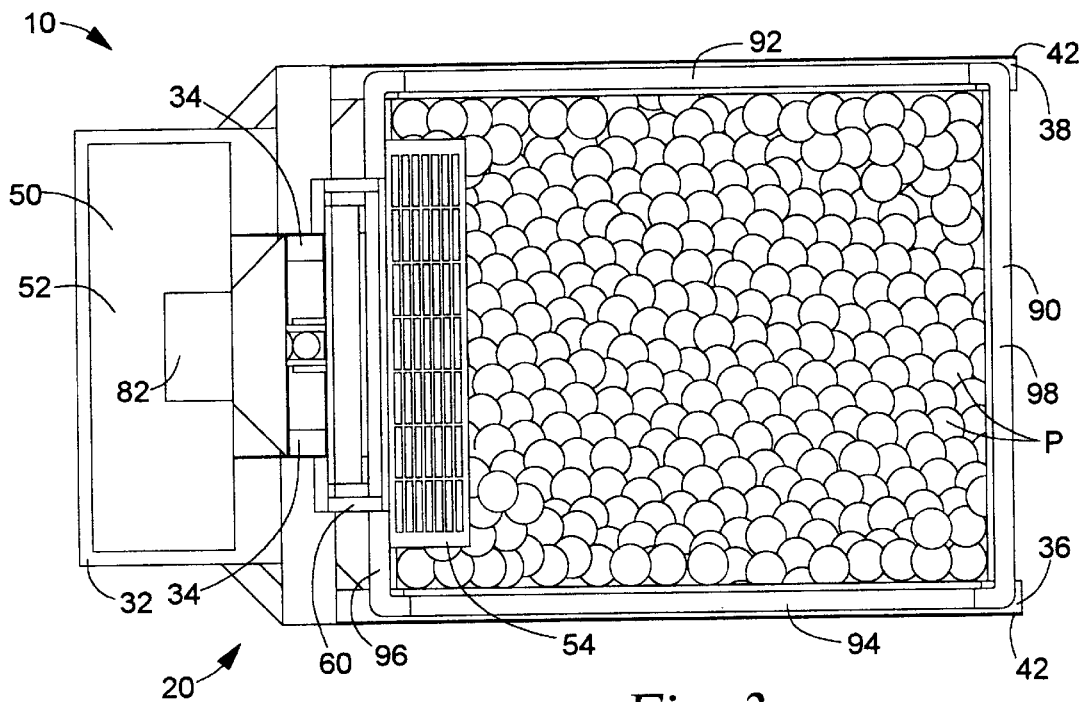
FIG. 3 is a plan view of an embodiment of the produce merchandiser of the present invention.
Figure 4:
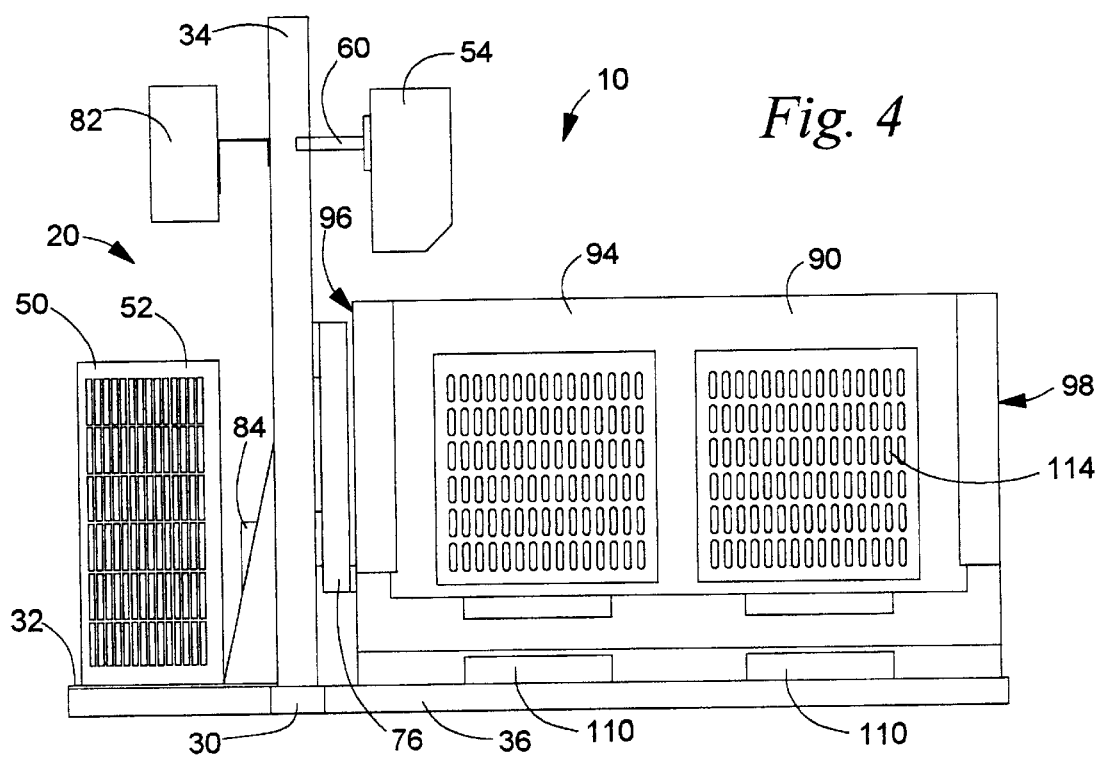
FIG. 4 is a side elevation view of an embodiment of the produce merchandiser of the present invention.

In an embodiment of the invention, the base 30 is substantially horizontal, and includes a platform 32 for supporting the refrigeration unit 50, as shown in FIGS. 1 through 11 and 16 through 18. A mast 34 extending substantially vertically from the base supports the lifting mechanism 70. Preferably, the mast includes a pair of pair of upright mast rails spaced apart from and parallel to one another. The base further includes a substantially horizontal bin support rail 36 to support the bin on the bin receiving structure and above the ground. Preferably, the first bin support rail 36 and a second bin support rail 38 are provided. The first and second bin support rails are substantially parallel to one another, and are spaced apart to receive and balance the bin 90, as shown in FIGS. 2 and 3. In an embodiment, each bin support rail includes a vertical lip 42 to aid in positioning the bin on the bin support rail.

In an embodiment, a plurality of wheels 44 is provided beneath the base 30 to allow rolling movement of the bin receiving structure 20. As shown in FIGS. 5, 6, 8 and 9, the wheels are positioned beneath the bin support rails 36, 38. Preferably, the wheels are also positioned beneath the platform 32 on the base. The wheels can be positioned in any location which allows for balanced rolling movement of the base unit with or without the bin 90 in place on the bin rails.

The refrigeration unit 50 is positioned on the bin receiving structure 20 of the produce merchandiser 10. In the embodiment shown in FIGS. 1, 2, 5 and 6 the refrigeration unit is a "split" system in which a condenser component 52 and an evaporator component 54 cooperate to generate cool air a. The condenser component contains a compressor and condenser coil, while the evaporator component contains an evaporation coil and blower. Coolant is sent in liquid form from the condenser component to the evaporator component via a supply hose 56, and then returned to the condenser unit in gas form via a return hose 58 after evaporation. The inventor has had success with a Friedrich Air Conditioning Company (San Antonio, Tex., USA) ductless split system cooling unit. However, it will be appreciated by those skilled in the art that other styles of refrigeration units are also considered to be within the scope of the invention.

According to an embodiment of the invention, and as shown in FIGS. 1–4, 8–11, and 16–18, the condenser component 54 of the refrigeration unit 50 is secured to the platform 32 provided on the base 30 of the bin receiving structure 20, while the evaporator component 54 of the system is secured to the mast 34. The evaporator component is positioned above the level of the produce p in the bin 90, so that the cooled air a from the evaporator component blows down onto the produce. The cooled air will naturally sink due to its greater density. However, a fan for creating an induced draft at the bottom of the bin may additionally be provided, to assist in bringing the cooled air down into the bin. Preferably, an evaporator attachment bracket 60 is provided on the mast for securing the evaporator component to the mast.

A one-piece refrigeration unit 50 may alternatively be used with the produce merchandiser 10 of the present invention. Like the split system described above, the refrigeration unit is mounted to the platform 32 of the frame 30. Ducting is provided for directing cooled air a from the refrigeration unit to the bin 90.

Figure 5:
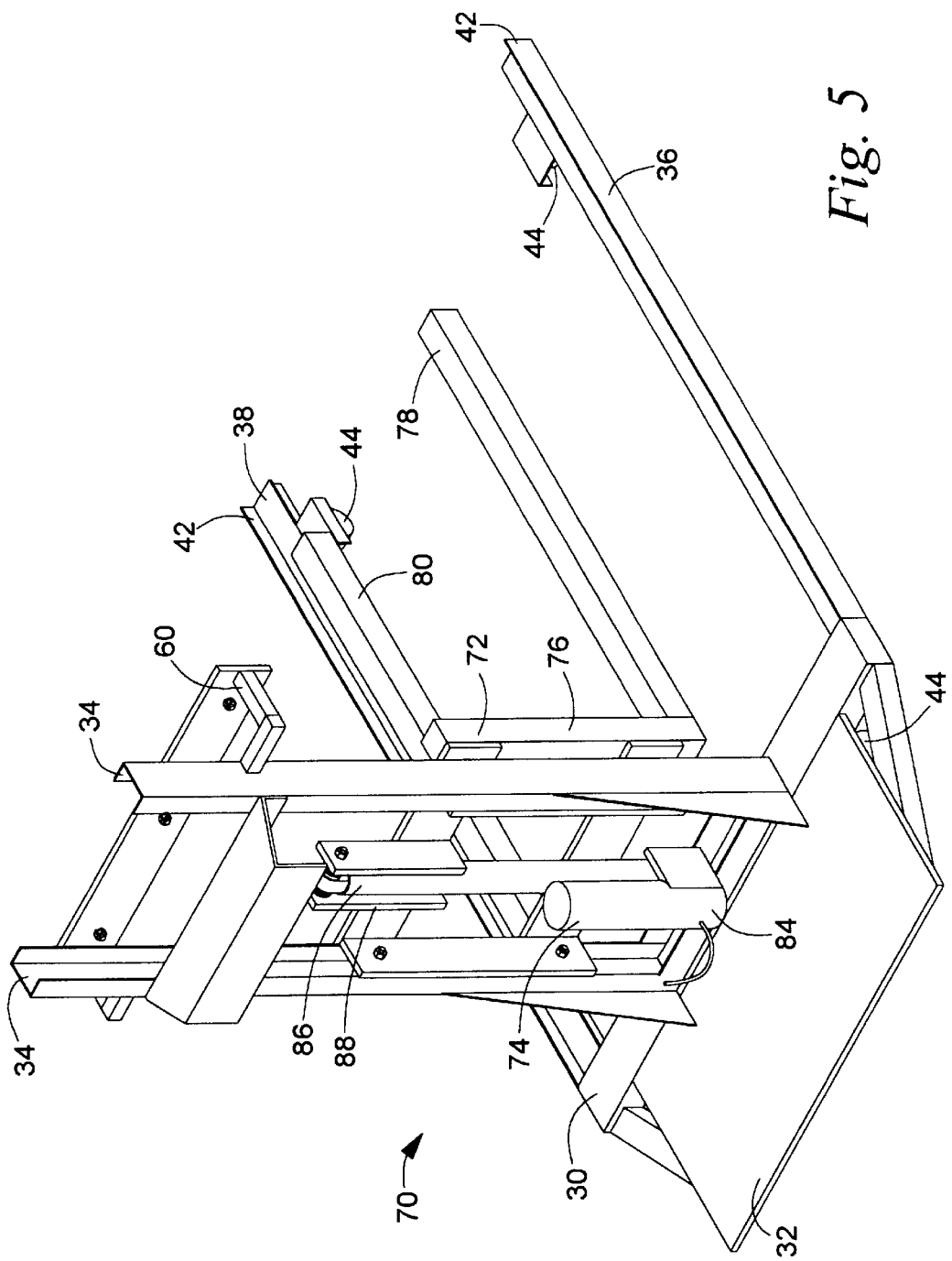
FIG. 5 is an isometric view of a portion of the base unit of the produce merchandiser of the present invention.
Figure 6:
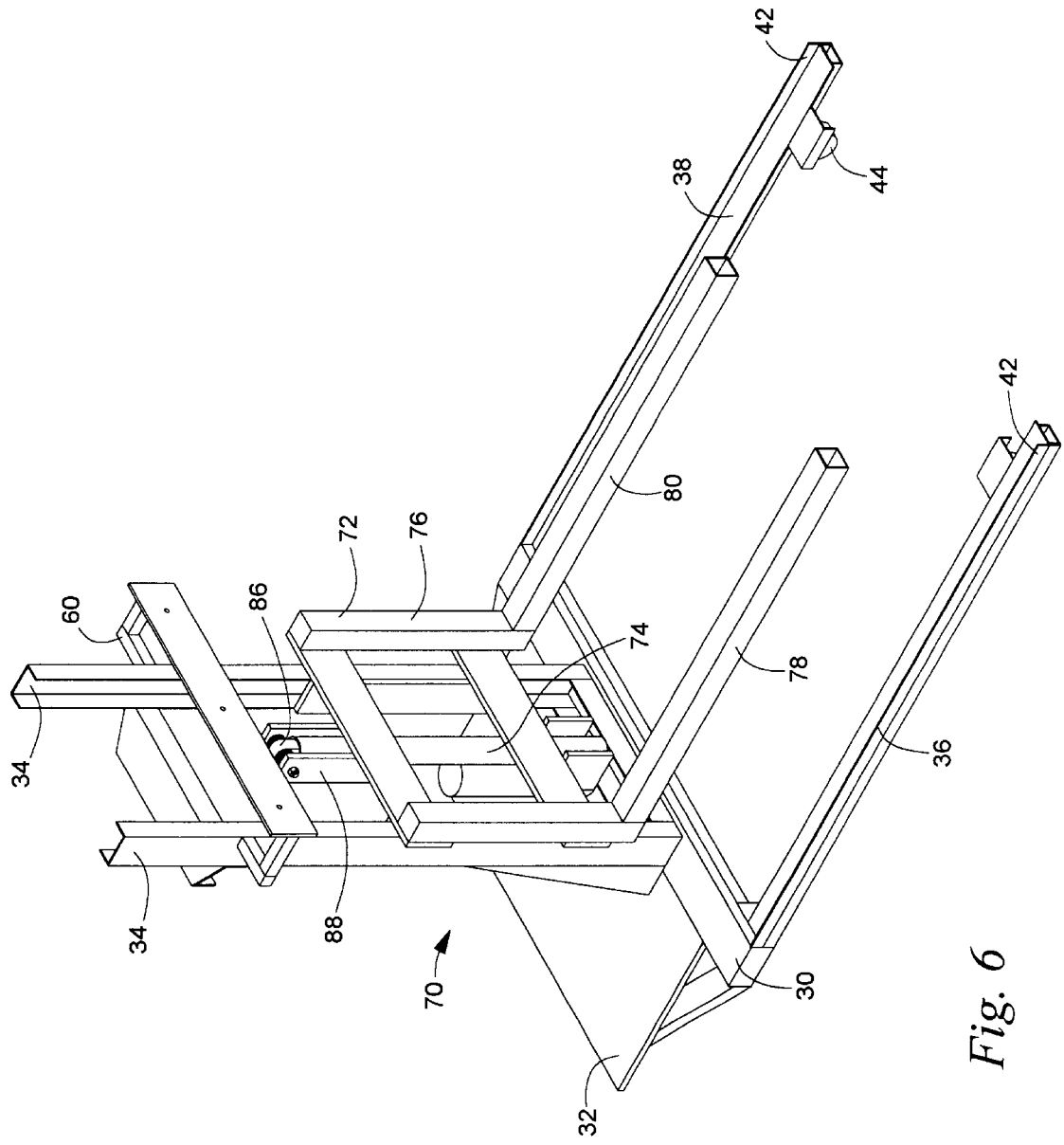
FIG. 6 is an isometric view of a portion of the base unit of the produce merchandiser of the present invention.
Figure 7:
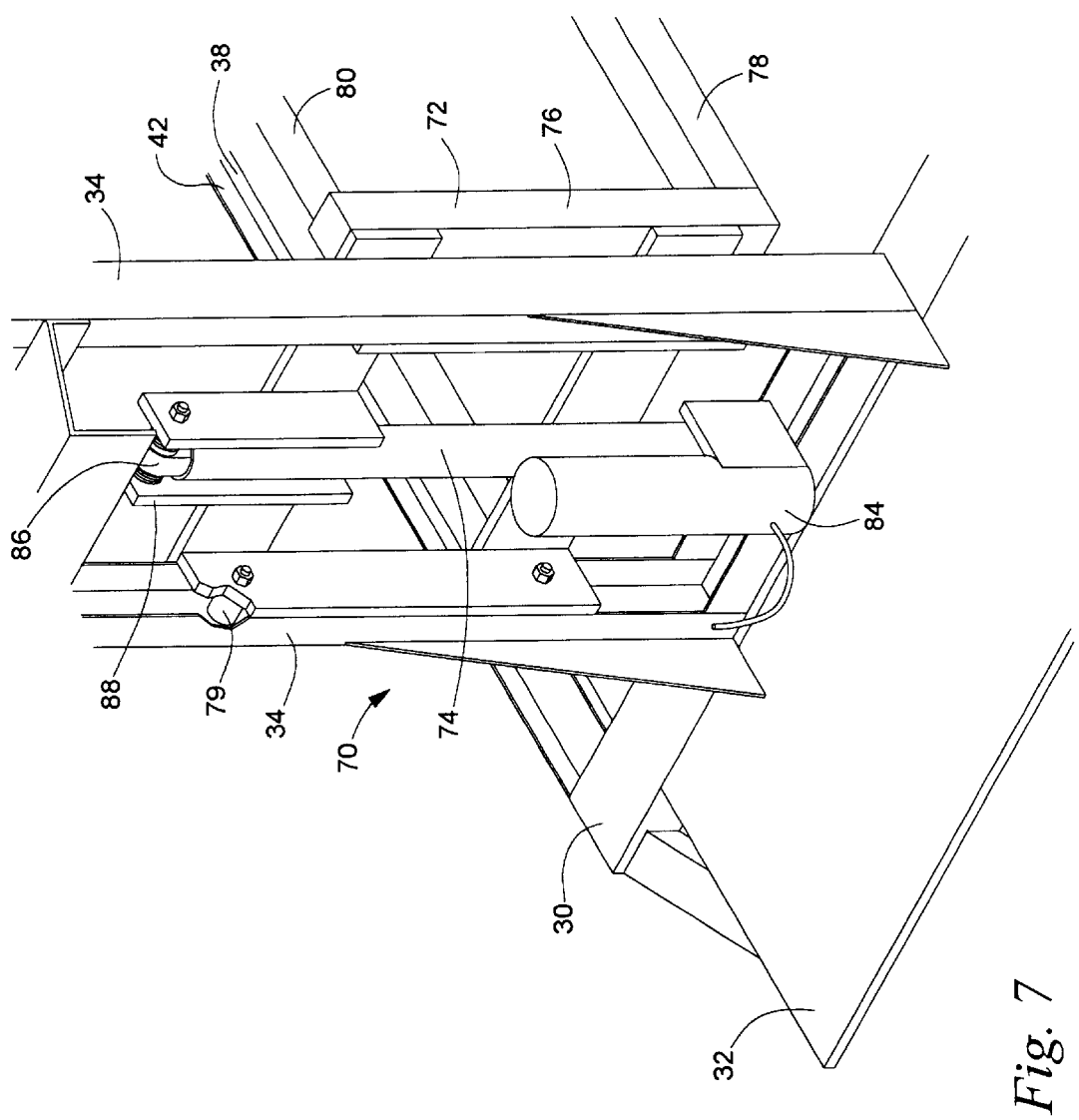
FIG. 7 is a detailed isometric view of the lifting mechanism of the produce merchandiser of the present invention.
Figure 8:
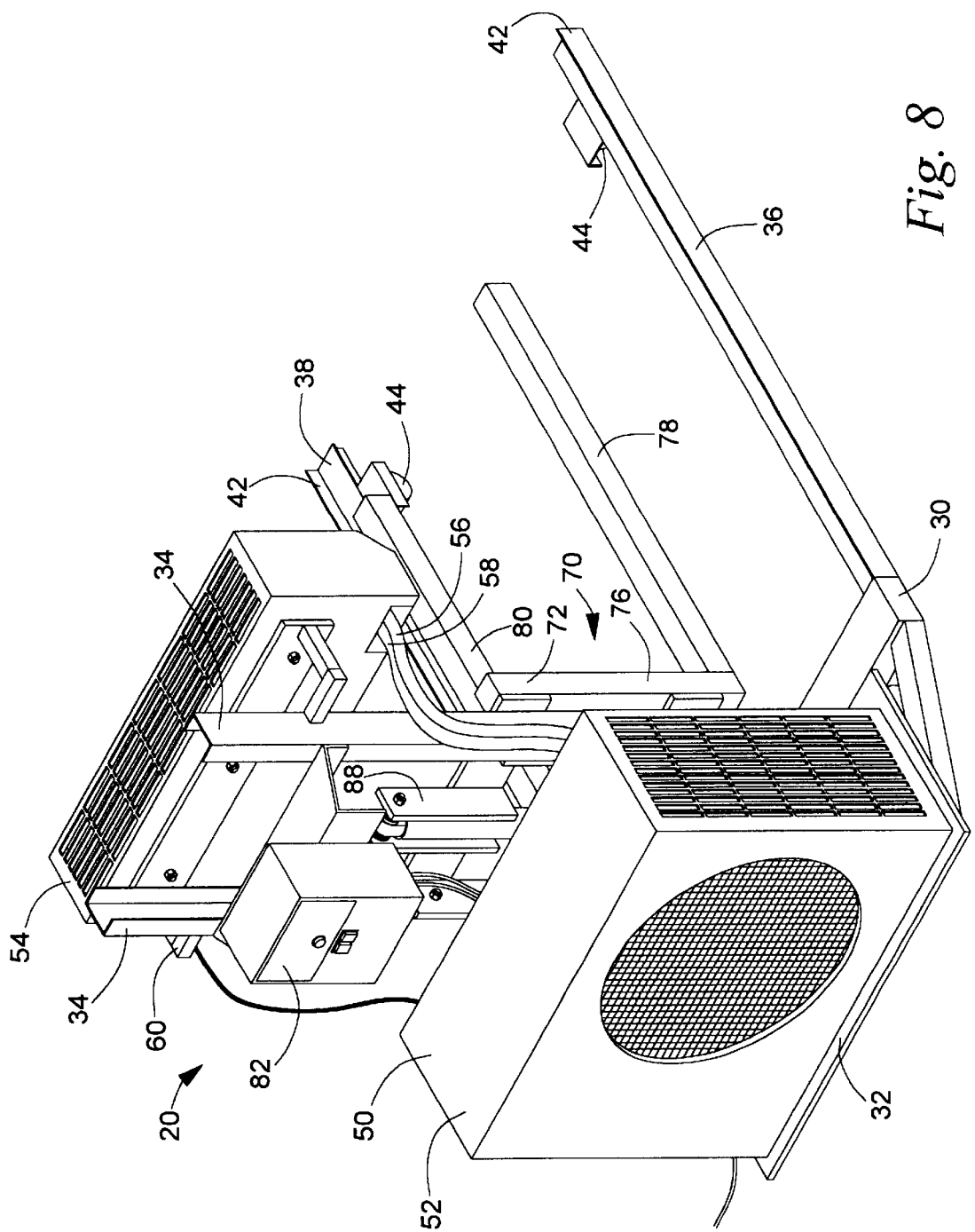
FIG. 8 is an isometric view of the base unit of the produce merchandiser of the present invention.
Figure 9:
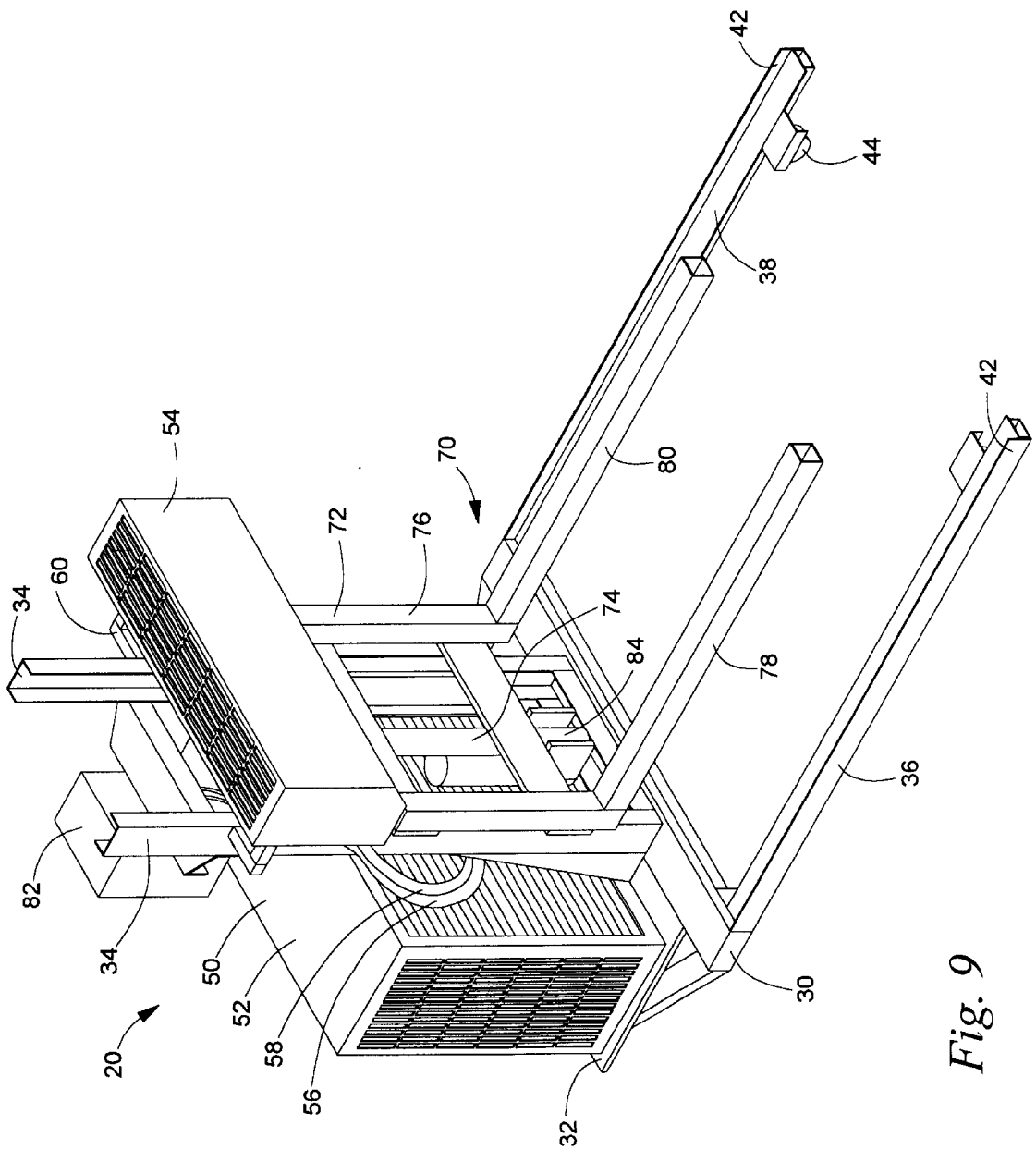
FIG. 9 is an isometric view of the base unit of the produce merchandiser of the present invention.
Figure 10:
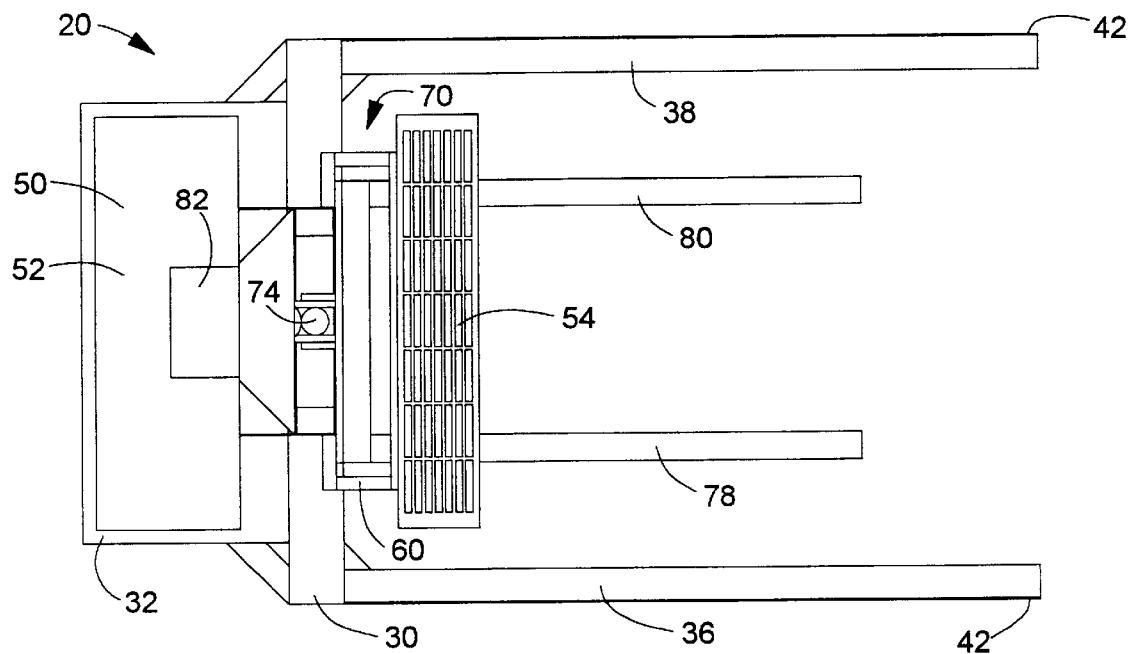
FIG. 10 is a plan view of the base unit of the produce merchandiser of the present invention.
Figure 11:
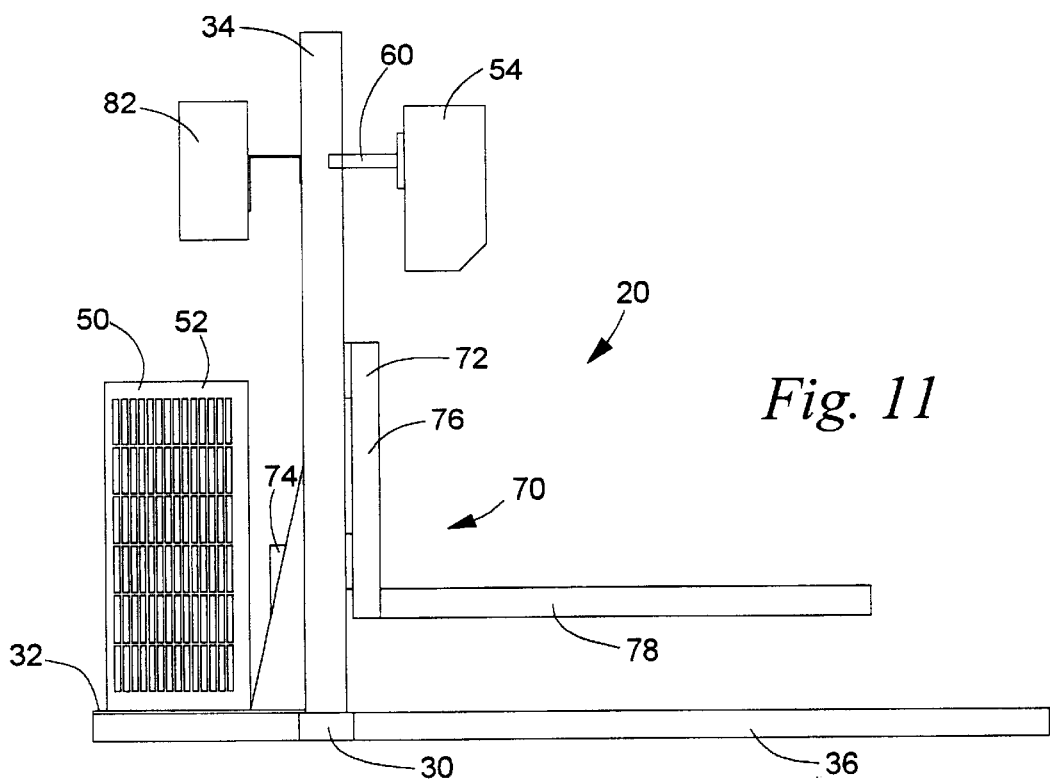
FIG. 11 is a side elevation view of the base unit of the produce merchandiser of the present invention.

The lifting mechanism 70 of the produce merchandiser is provided to raise and lower the movable floor 102 of the bin 90. Preferably, the lifting mechanism generally includes a carriage 72 and an actuator 74, as shown in FIGS. 5–7. The carriage includes a substantially vertical carriage frame 76 and at least one bin floor support arm 78 extending substantially perpendicularly from the carriage frame. The carriage frame is adapted to travel vertically on the mast 34 on a plurality of rollers 79, as shown in FIG. 7. Preferably, as best shown in FIGS. 5 through 10, two substantially parallel bin floor support arms 78, 80 are provided.

The actuator 74 of the lifting mechanism 70 is a device which can apply sufficient force to raise and lower the carriage 72 on the mast 34 when the bin floor support arms 78, 80 are engaged with the movable floor 102 of the bin 90. In an embodiment, the actuator is an electromechanical actuator, as shown in FIGS. 5 through 7. An AC actuator control 82, as shown in FIGS. 1 through 4, 8 through 11, 17, and 18, can be used to control the actuator. In an additional preferred embodiment, the actuator is a telescoping or staged hydraulic actuator which allows for maximum extension while requiring minimal vertical space. Other types of lifting devices, such as scissor or ratchet jacks, can also function as the actuator for the lifting mechanism.

The actuator 74 has a base 84 and an extension member 86, as best seen in FIG. 3. The actuator base is secured to the base 30 of the bin receiving structure 20, and the extension member is secured to the carriage 72. Preferably, an actuator attachment bracket 88 is provided on the carriage frame 76 for receiving the extension member of the actuator. When the actuator is activated, the extension member extends substantially vertically from the actuator base and raises the carriage.

Figure 14:
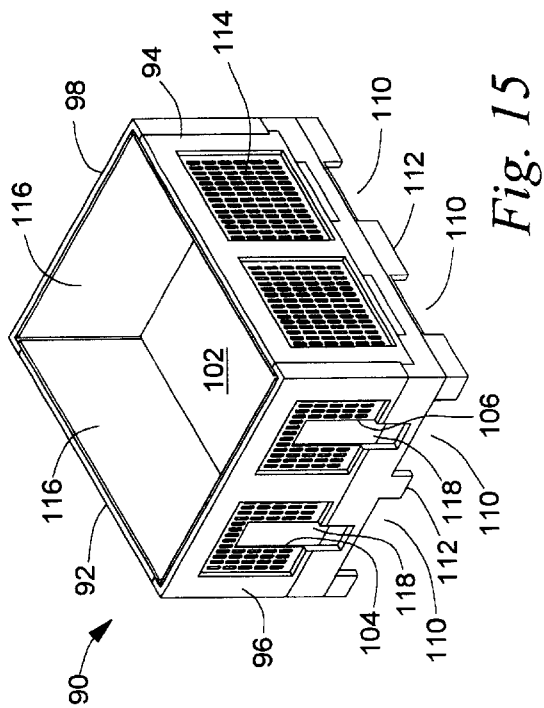
FIG. 14 is an isometric view of the bin of the produce merchandiser of the present invention.
Figure 15:
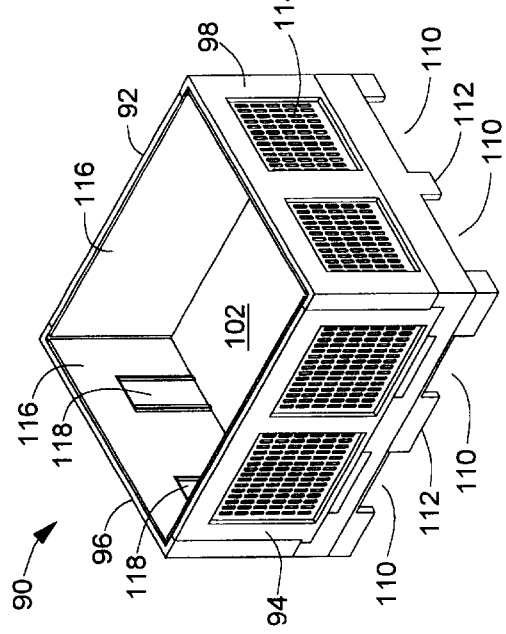
FIG. 15 is an isometric view of the bin of the produce merchandiser of the present invention.

The bin 90 of the present invention is a container suitable for transporting and storing fruit. Preferably, the bin is a ventilated plastic fruit bin as shown in FIGS. 1 through 4 and 14 through 18, similar to those typically used in the produce packing industry. The bin includes a first side wall 92 and a second side wall 94, spaced apart from and parallel to one another; a first end wall 96 perpendicular to the side walls; a second end wall 98 spaced apart from and parallel to the first end wall; and a movable floor 102. Preferably, the bin also includes a stationary floor 100. The first end wall includes a support arm aperture 104 for receiving the bin floor support arm 78 of the lifting mechanism 70. In a preferred embodiment of the invention, and as shown in FIGS. 14 and 15, a pair of support arm apertures 104, 106 is provided for receiving the bin floor support arms 78, 80. The movable floor is positioned over the stationary floor of the bin, and spaced above the stationary floor with spacers 108. The spacers support the movable floor a sufficient distance above the stationary floor to allow the insertion of the bin floor support arms into the support arm apertures between the stationary floor and the movable floor.

In an embodiment, the bin 90 is collapsible. The side walls 92, 94 are hingedly connected to the stationary floor 100 of the bin, and can be folded to rest coplanar with the stationary floor. Similarly, the first and second end walls 96, 98 are hinged, and can be folded to rest on the side walls. With the side and end walls of the empty bin collapsed, the bin takes up less space in shipping and storage.

Preferably, the bin 90 is adapted to be lifted and transported by a pallet jack or fork lift. According to an embodiment, fork openings 110 are provided along the lower edge 112 of the bin as shown in FIGS. 1, 2, 14, and 15 through 18.

Figure 12:
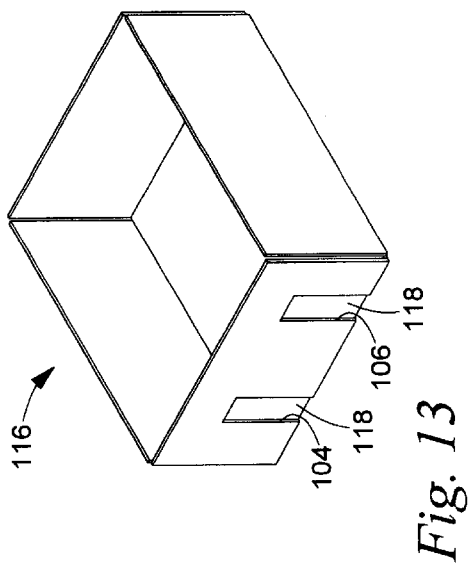
FIG. 12 is an isometric view of the bin liner of the produce merchandiser of the present invention.
Figure 13:
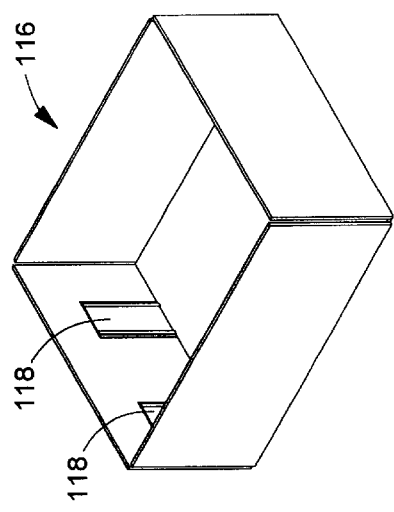
FIG. 13 is an isometric view of the bin liner of the produce merchandiser of the present invention.

A typical produce bin has perforations 114 in its walls to allow air movement around the produce p stored therein. This feature aids in cooling the produce when it is placed in controlled atmosphere storage. However, when the produce bin is removed from controlled atmosphere storage, the produce rapidly assumes the temperature of the surrounding environment due to air flow through the perforations. Therefore, in an embodiment of the invention and as shown in FIGS. 12 through 15, the bin 90 further includes a liner 116 for partially or completely blocking the flow of air through the perforations 114 in the bin side walls 92, 94 and first and second end walls 96, 98. The liner may be a single contiguous panel, or it may comprise a plurality of panels. The liner may be secured to the inner or outer surface of the bin. In a preferred embodiment, the liner comprises a plurality of panels secured to the inner walls of the bin, as shown in FIGS. 12 and 13. This feature helps to maintain the ideal temperature of the produce once it has been removed from storage.

The bin 90 of the present invention may additionally include at least one support arm aperture gates 118. Preferably, a pair of support arm aperture gates are provided, as shown in FIGS. 12, 14, 17 and 18. The support arm aperture gates are positioned to prevent produce p from falling out of the bin through the support arm apertures 104, 106. In an embodiment, the support arm aperture gates are slidably affixed to the liner 116 at the first end wall 96 of the bin, as shown in FIGS. 12 and 14. As the movable floor 102 of the bin is raised, the support arms 78, 80 slide the support arm aperture gates in an upward direction.

It should be noted that the bin 90 herein described and shown is constructed by modifying a typical plastic produce bin. However, a bin that is molded to include the requirements of the invention is also contemplated by the inventor, and considered to be within the scope of the invention. For example, an injection molded plastic fruit bin having a movable floor and support arm apertures formed integrally therein, could serve as the bin of the present invention.

Figure 16:
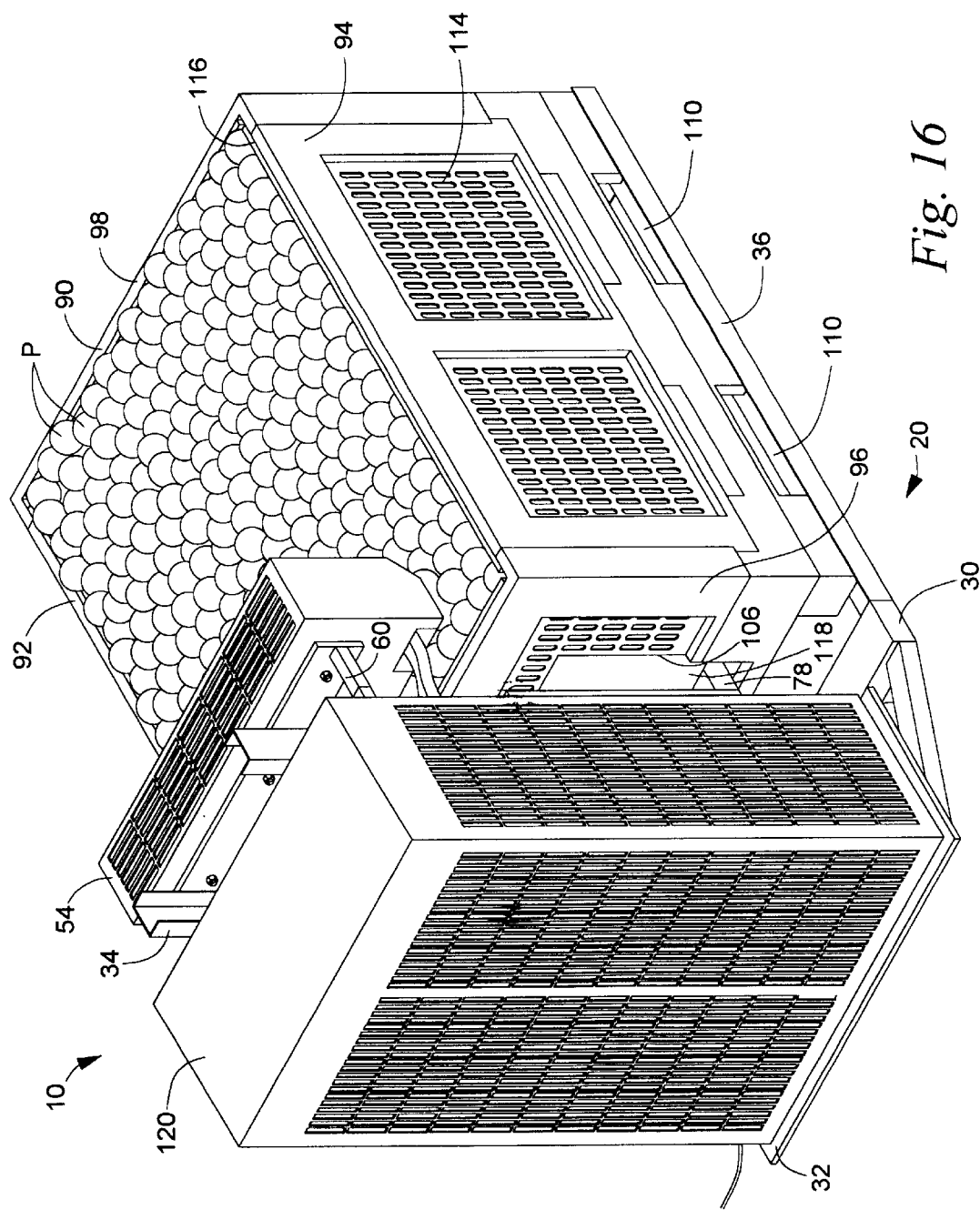
FIG. 16 is an isometric view of an embodiment of the produce merchandiser of the present invention.
Figure 17:
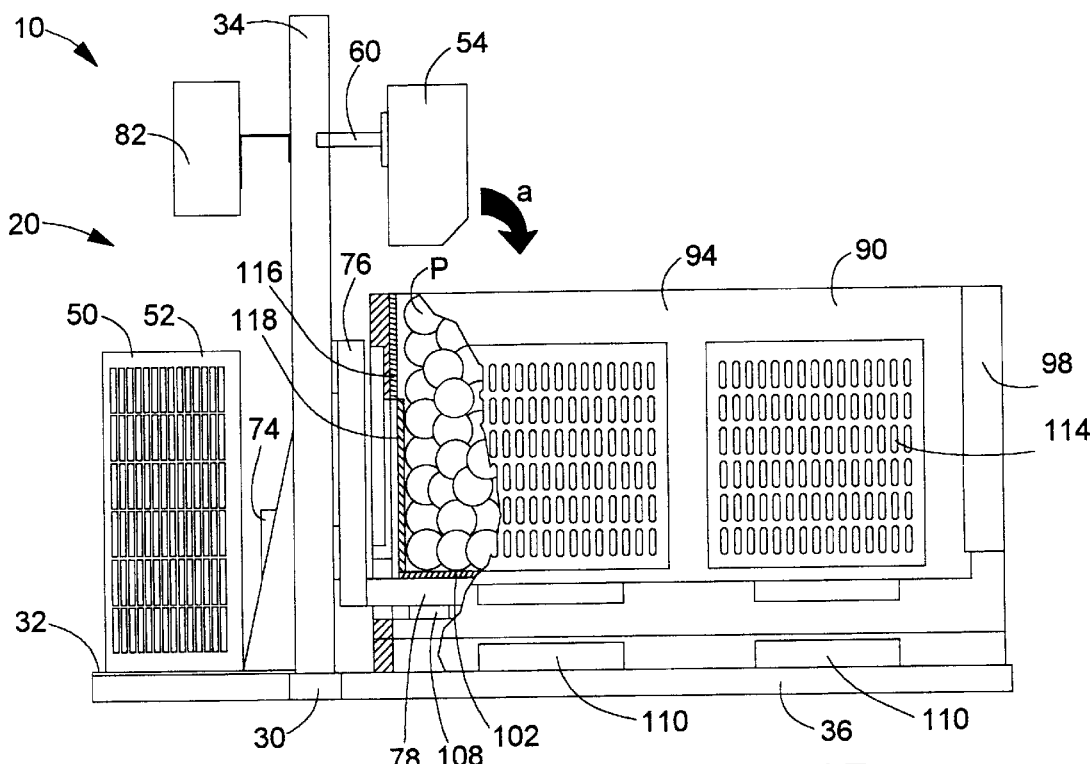
FIG. 17 is a side elevation view of an embodiment of the produce merchandiser of the present invention, showing the movable bin floor in a lowered position.
Figure 18:
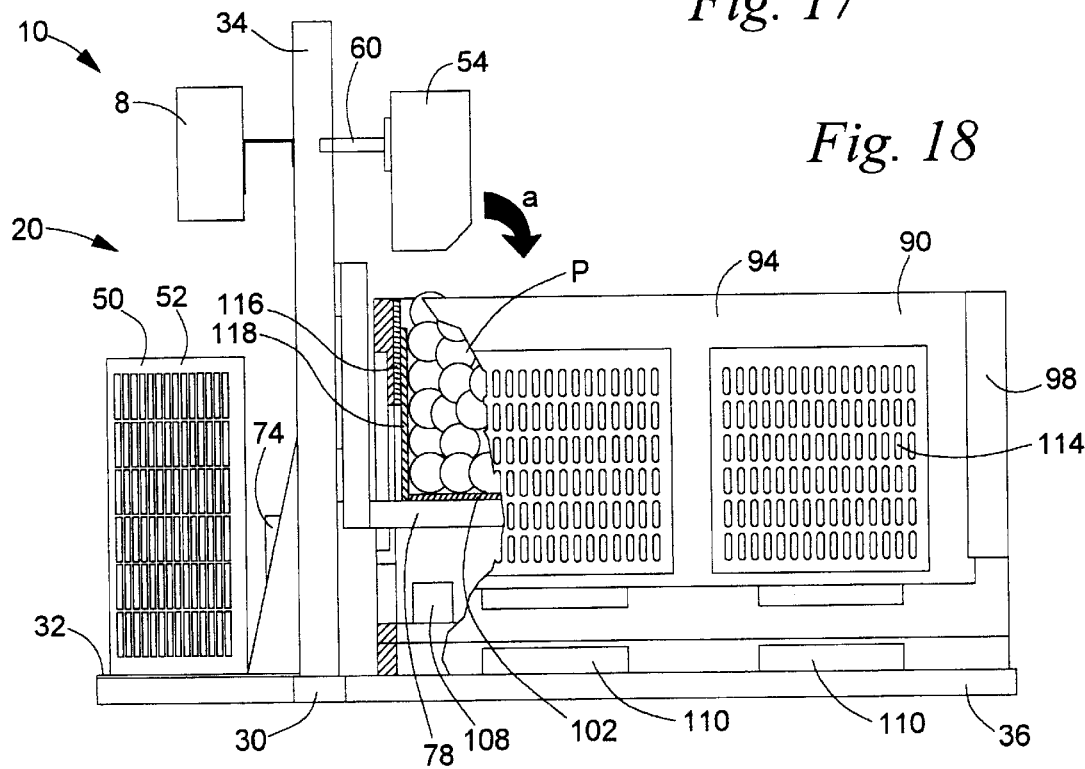
FIG. 18 is a side elevation view of an embodiment of the produce merchandiser of the present invention, showing the movable bin floor in a raised position.

In an embodiment of the invention, a cabinet 120 is provided on the bin receiving structure to enclose the refrigeration unit 50 and the lifting mechanism 70, as shown in FIG. 16. The cabinet protects consumers from possible injury from moving parts, and also protects the refrigeration unit and lifting mechanism from tampering.

The produce merchandiser 10 of the present invention is used to store and display produce p in a retail environment. Such use encompasses retail stores, farmers markets, fruit stands, warehouse stores, and the like. Clean, sale-ready produce p is packed in the bin 90 in preparation for display. The produce may be in bulk, with no other packaging, or in prepackaged units. For example, apples may be packed in five or ten pound bags, which are then packed in the bin. The filled bin can be held in controlled atmosphere storage for as long as is practicable to retain optimal produce quality and prolong shelf life. The bin is transferred to a display location, as discussed above. The transfer may involve simply moving the bin from a storage room to an adjacent retail location with a pallet jack. Alternatively, the transfer may involve additional steps, including loading the bin onto a refrigerated truck, train car, or other shipping container with a forklift or pallet jack, and then unloading the bin at a destination warehouse or retail location.

The bin receiving structure 20 of the produce merchandiser 10 is positioned at a display location to receive the bin 90 loaded with produce p. The bin is removably installed on the bin receiving structure with a forklift or a pallet jack.

This is accomplished by raising the bin to a height at which the lower edge 112 of the bin will clear the height of the first and second bin support rails 36, 38 of the frame 30, then advancing the bin with the forklift or pallet jack onto the base unit. The height of the first and second bin floor support arms 78, 80 can be adjusted by raising or lowering the carriage 72, so that as the bin is advanced, the bin floor support arms extend through the support arm apertures 104, 106 in the first end wall 96 of the bin and are positioned between the stationary floor 100 and the movable floor 102 of the bin. When the bin has been completely advanced onto the bin receiving structure 20 the pallet jack or forklift is used to lower the bin onto the first and second bin support rails 36, 38. The pallet jack or forklift can then be removed, and the produce merchandiser is ready to function as a refrigerated display unit.

The level of produce p in the bin 90 is reduced as produce is removed by consumers. As the level of produce goes down, it becomes more difficult and less appealing to the consumer to reach down into the bin to select and retrieve produce. To maintain the level of produce at an easily accessible height, the lifting mechanism 70 of the produce merchandiser 10 is activated. In a preferred embodiment, the AC actuator control 82 is engaged to extend the actuator 74, which in turn raises the carriage 72, and thus the bin floor support arms 78, 80 of the lifting mechanism. The bin floor support arms engage and lift the movable floor 102 of the bin to a desired height.

When the bin 90 is empty, the AC actuator control 82 is engaged to retract the actuator 74, lowering the carriage 72 and thus the bin floor support arms 78, 80. The movable floor 102 of the bin is lowered to a resting position on the spacers 108 positioned on the stationary floor 100 of the bin. A pallet jack or forklift can once again be engaged, this time to slightly raise the bin, and remove it from the bin receiving structure 20 of the produce merchandiser 10. The empty bin can be returned to the supplier for reuse, while a full bin is installed on the base unit at the display location.

In compliance with the statutes, the invention has been described in language more or less specific as to structural features and process steps. While this invention can be embodied in different forms, the specification describes and illustrates preferred embodiments of the invention. It will be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims, as appropriately interpreted in accordance with the doctrine of equivalents.

What is claimed is:

1. A produce merchandiser for displaying produce at a controlled temperature, the produce merchandiser comprising:
    a bin receiving structure, the bin receiving structure including:
        a base;
        a refrigeration unit mounted on the base, the refrigeration unit for supplying cool air to the produce;
        a mast mounted to the base and extending substantially vertically therefrom; and
        a lifting mechanism, the lifting mechanism including a carriage and an actuator, the carriage including at least one bin floor support arm, the carriage mounted on the mast and adapted to travel vertically on the mast, and the actuator for raising and lowering the carriage; and
    a bin received on the base unit, the bin including:
        a first side wall and a second side wall, the first and second side walls spaced apart from and parallel to one another,
        a first end wall substantially perpendicular to the first and second side walls,
        a second end wall spaced apart from and parallel to the first end wall;
        at least one support arm aperture in the first end wall of the bin for receiving the bin floor support arm; and
        a movable floor, the movable floor engageable with the carriage of the bin receiving structure.

2. The produce merchandiser of claim 1, wherein the base further includes at least one substantially horizontal bin support rail for receiving and balancing the bin.

3. The produce merchandiser of claim 2, wherein a first and second substantially horizontal bin support rail are provided, the bin support rails positioned in parallel, spaced apart relation to one another.

4. The produce merchandiser of claim 1, wherein the refrigeration unit is a split system refrigeration unit having a condenser component and an evaporator component, the condenser component mounted on the base, and the evaporator component mounted on the mast.

5. The produce merchandiser of claim 1, wherein the mast comprises a pair of upright mast rails spaced apart from and parallel to one another.

6. The produce merchandiser of claim 1, wherein the actuator is a hydraulic actuator.

7. The produce merchandiser of claim 1, wherein the actuator is a electromechanical actuator.

8. The produce merchandiser of claim 1, wherein the carriage includes a first bin floor support arm and a second bin floor support arm, the bin floor support arms spaced apart from and parallel to one another.

9. The produce merchandiser of claim 1, wherein the bin walls include perforations, and the bin includes a liner for limiting the flow of air through the perforations.

10. The produce merchandiser of claim 1, wherein the bin is collapsible.

11. The produce merchandiser of claim 1, wherein a pair of support arm apertures are provided for receiving the bin floor support arms.

12. The produce merchandiser of claim 1, further including at least one support arm aperture gate for preventing produce from falling out of the bin through the support arm aperture, the support arm aperture gate slidably mounted to cover the support arm aperture provided in the bin.

13. A method of storing and displaying produce under temperature controlled conditions with a produce merchandiser, the produce merchandiser including:
    a bin receiving structure, the bin receiving structure including:
        a base;
        a refrigeration unit mounted on the base, the refrigeration unit for supplying cool air to the produce;
        a mast mounted to the base and extending substantially vertically therefrom; and
        a lifting mechanism, the lifting mechanism including a carriage and an actuator, the carriage including at least one bin floor support arm, the carriage mounted on the mast and adapted to travel vertically on the mast, and the actuator for raising and lowering the carriage; and
    a bin received on the base unit, the bin including:

a first side wall and a second side wall, the first and second side walls spaced apart from and parallel to one another;

a first end wall substantially perpendicular to the first and second side walls, a second end wall spaced apart from and parallel to the first end wall;

at least one support arm aperture in the first end wall of the bin for receiving the bin floor support arm; and a movable floor, the movable floor engageable with the carriage of the bin receiving structure;

the method including the steps of:

packing the produce in the bin;

removably installing the bin on the bin receiving structure of the produce merchandiser so that the bin floor support arm is positioned within the support arm aperture of the bin; and directing cooled air from the refrigeration unit onto the produce in the bin to maintain the produce at a favorable temperature.

14. The method of claim 13, further including the step of raising the movable bin floor by activating the actuator of the lifting mechanism to raise the carriage, and thus the bin floor support arm, of the lifting mechanism.

\* \* \* \* \*